United States Patent
Yi et al.

(10) Patent No.: US 8,664,641 B2
(45) Date of Patent: Mar. 4, 2014

(54) NANO DEVICE INTEGRATED ON GRAPHENE AND MONOCRYSTALLINE GRAPHITE

(75) Inventors: Gyu-chul Yi, Seoul (KR); Yong-Jin Kim, Busan (KR)

(73) Assignee: SNU R&DB Foundation, Seoul (KR)

( * ) Notice: Subject to any disclaimer, the term of this patent is extended or adjusted under 35 U.S.C. 154(b) by 69 days.

(21) Appl. No.: 13/376,382

(22) PCT Filed: May 27, 2010

(86) PCT No.: PCT/KR2010/003354
§ 371 (c)(1),
(2), (4) Date: Feb. 16, 2012

(87) PCT Pub. No.: WO2010/140789
PCT Pub. Date: Dec. 9, 2010

(65) Prior Publication Data
US 2012/0132892 A1    May 31, 2012

(30) Foreign Application Priority Data
Jun. 3, 2009  (KR) .................. 10-2009-0049123

(51) Int. Cl.
*H01L 29/06* (2006.01)
(52) U.S. Cl.
USPC ............................................. 257/24; 438/20
(58) Field of Classification Search
USPC ............................................. 257/24; 438/20
See application file for complete search history.

(56) References Cited

U.S. PATENT DOCUMENTS

2009/0029221 A1  1/2009  Goddard et al.

FOREIGN PATENT DOCUMENTS

| JP | 2008-120660 A | 5/2008 |
| JP | 2008-192465 A | 8/2008 |
| WO | WO 2008-116661 A2 | 10/2008 |
| WO | WO 2008/140611 | * 11/2008 |

OTHER PUBLICATIONS

"Graphene." Encyclopaedia Britannica. Encyclopaedia Britannica Online Academic Edition. Encyclopaedia Britannica Inc., 2013. Web. Jun. 6, 2013.*
"Graphite." Encyclopaedia Britannica. Encyclopaedia Britannica Online Academic Edition. Encyclopaedia Britannica Inc., 2013. Web. Jun. 6, 2013.*
"Substrate". Dictionary.com. Unabridged. Random House, Inc. http://dictionary.reference.com/browse/substrate (accessed: Jun. 14, 2013).*
International Search Report with English translation, mailing date Jan. 31, 2011, for corresponding International Application No. PCT/KR2010/003354.

* cited by examiner

*Primary Examiner* — Jami M Valentine
(74) *Attorney, Agent, or Firm* — Intellectual Property Law Group LLP (57) ABSTRACT

Disclosed herein is a nano device, including: a carbon layer including one-layered graphene having a honeycombed planar structure in which carbon atoms are connected with each other and two or more-layered monocrystalline graphite; and one or more vertically-grown nanostructures formed on the carbon layer. This nano device can be used to manufacture an integrated circuit in which various devices including a graphene electronic device and a photonic device are connected with each other, and is a high-purity and high-quality nano device having a small amount of impurities because a metal catalyst is not used.

22 Claims, 13 Drawing Sheets

NANO DEVICE INTEGRATED ON GRAPHENE AND MONOCRYSTALLINE GRAPHITE

CROSS-REFERENCE TO RELATED APPLICATIONS

This application is a U.S. National Phase application, under 35 U.S.C. §371, of International Application no. PCT/KR2010/003354, with an international filing date of May 27, 2010 and claims benefit of Republic of Korea Application no. 10-2009-0049123 filed on Jun. 3, 2009, and which are hereby incorporated by reference for all purposes.

TECHNICAL FIELD

The present invention relates to a nano device, and, more particularly, to a nano device including: a carbon layer including one-layered graphene having a honeycombed planar structure in which carbon atoms are connected with each other and two or more-layered monocrystalline graphite; and one or more vertically-grown nanostructures formed on the carbon layer.

BACKGROUND ART

Graphene is a two-dimensional form of crystalline carbon, either a single layer of carbon atoms forming a honeycomb (hexagonal) lattice or several coupled layers of this honeycomb structure.

Graphite, which is a carbon compound, has a layered structure that consists of rings of six carbon atoms arranged in widely spaced horizontal sheets. A one atom thick layer of graphite is referred to "graphene".

The properties of graphene are quite different from those of carbon nanotubes in which carbon atoms are connected with each other in the form of a cylinder.

Electrons pass through graphene at a velocity of $10^5$ m/sec ($\frac{1}{3000}$ of light velocity). Such graphene is more suitable for being used as an electronic device than carbon nanotubes having both semiconductor properties and metal properties being used.

Further, graphene has lately attracted considerable attention because it has excellent electrical and mechanical characteristics.

As such, the range of applications of graphene will become forever wider in the future, and examples of applications thereof may include transparent flexible displays, ultrahigh-speed nano memory, next-generation solar cells, etc.

In particular, research has been done into manufacturing an electronic device using graphene. For example, research into integrating a silicon-based electronic device with a photonic device to provide functionality has yielded a graphene electronic device which is integrated with various devices such as a photonic device, a memory device and the like, thus providing more functionality. As is well known, graphene is usefully used as an electron device, but is problematic in that it is difficult to develop a photonic device (particularly in the visible region or ultraviolet region) using graphene.

In order to overcome such a problem, it is very important to fabricate a device in which various functional nanostructures are formed on monocrystalline graphene.

SUMMARY OF THE INVENTION

Technical Problem

Accordingly, the present invention has been devised to solve the above-mentioned problem, and an object of the present invention is to provide a nano device which can be integrated on graphene and monocrystalline graphite.

Technical Solution

In order to accomplish the above object, an aspect of the present invention provides a nano device, including: a carbon layer including one-layered graphene having a honeycombed planar structure in which carbon atoms are connected with each other and two or more-layered monocrystalline graphite; and one or more vertically-grown nanostructures formed on the carbon layer.

The nano device may further include: a substrate disposed beneath the carbon layer to constitute a circuit.

The nanostructure may be any one selected from a nanorod, a nanoneedle, a nanotube and a nanowall.

The nanostructure may have a ratio of length to diameter (thickness) of 1~1000.

The nanostructure may have a diameter (thickness) of 1 nm~500 nm.

The nanostructure may have a height of 10 nm~100 μm.

The nanostructure may be made of a metal or a semiconductor.

A recess may be formed on the carbon layer.

The recess may have any one shape selected from a circle, a triangle, a quadrangle, a pentagon, a hexagon and a line.

The recess may act as a seed layer for growing the nanostructure.

Two or more recesses may be formed on the carbon layer, and the distance between the recesses may be 1 nm~10 μm.

Two or more recesses having a different shape from each other may be formed on the carbon layer.

The nano device may further include: a mask layer between the carbon layers and the one or more nanostructures, the mask layer having one or more openings.

The opening may have any one shape selected from a circle, a triangle, a quadrangle, a pentagon, a hexagon and a line.

The distance between the openings may be 1 nm~10 μm.

The nano device may further include: a multilayer film uniformly covering the surface of the nanostructure.

The multilayer film may have a thickness of 0.1 nm~1000 nm.

The nanostructure may be coated with the multilayer film to form a plurality of junctions.

The junction of the multilayer film and the nanostructure may have a quantum well structure.

The nanostructures may be coated with the multilayer film to form a p-n junction.

In order to accomplish the above object, another aspect of the present invention provides a nano device, including: a carbon layer including one-layered graphene having a honeycombed planar structure in which carbon atoms are connected with each other and two or more-layered monocrystalline graphite; a source electrode formed on the carbon layer; one or more vertically-grown nanostructures formed on the carbon layer; an insulator formed between the one or more nanostructures; and a drain electrode formed on the one or more nanostructures.

The nano device may further include: a dielectric layer formed around the nanostructures.

Advantageous Effects

According to the present invention, there is provided a nano device including: a carbon layer including one-layered graphene having a honeycombed planar structure in which carbon atoms are connected with each other and two or more-layered monocrystalline graphite; and one or more vertically-grown nanostructures formed on the carbon layer, thus providing an integrated circuit in which various devices including a graphene electronic device and a photonic device are connected with each other.

Further, according to the present invention, there is provided a high-purity and high-quality nano device having a small amount of impurities because a metal catalyst is not used.

DESCRIPTION OF THE REFERENCE NUMERALS IN THE DRAWINGS

10: carbon layer
20: nanostructure
30: substrate

DETAILED DESCRIPTION OF SPECIFIC EMBODIMENTS

The objects, features and advantages of the present invention will be more clearly understood from the following detailed description and preferred embodiments taken in conjunction with the accompanying drawings. Throughout the accompanying drawings, the same reference numerals are used to designate the same or similar components, and redundant descriptions thereof are omitted. Further, in the following description, the terms "first," "second," "third" and the like are used to illustrate different parts, components, areas, layers and/or sections, but are not limited thereto. The terms are used to differentiate a certain part, component, area, layer or section from other part, component, area, layer or section. Accordingly, a first part, component, area, layer or section, which will be mentioned hereinafter, may be referred to as a second part, component, area, layer or section without departing from the scope of the present invention.

The technical terms used in the present specification are set forth to mention specific embodiments of the present invention, and do not intend to define the scope of the present invention. The singular number used here includes the plural number as long as the meaning of the singular number is not clearly opposite to that of the plural number. In the present specification, the terms "have", "include", "comprise" and the like are used to differentiate a certain component from other components, such as characteristics, region, integer, step, operation, element, component, and the like, and are used to add other components, such as characteristics, region, integer, step, operation, element, component, and the like, to a certain component.

Hereinafter, preferred embodiments of the present invention will be described in detail with reference to FIGS. 1 to 12. However, these embodiments are set forth to illustrate the present invention, and the scope of the present invention is not limited thereto.

As described above, each of graphene and monocrystalline graphite has a honeycombed planar structure in which carbon atoms are connected with each other. One fold of the monocrystalline graphite is defined as "graphene".

Therefore, in the present invention, as a component to be selectively used to grow nanostructures, a carbon layer including graphene and monocrystalline graphite is used.

Figure 1:
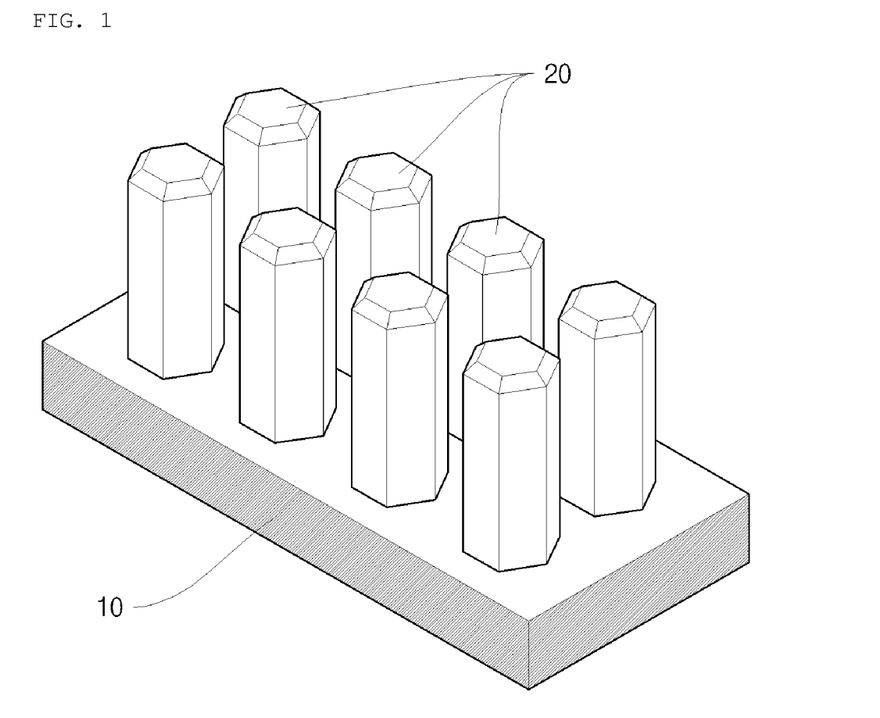
FIGS. 1 and 2 are perspective views showing basic nano devices according to preferred embodiments of the present invention.
Figure 2:
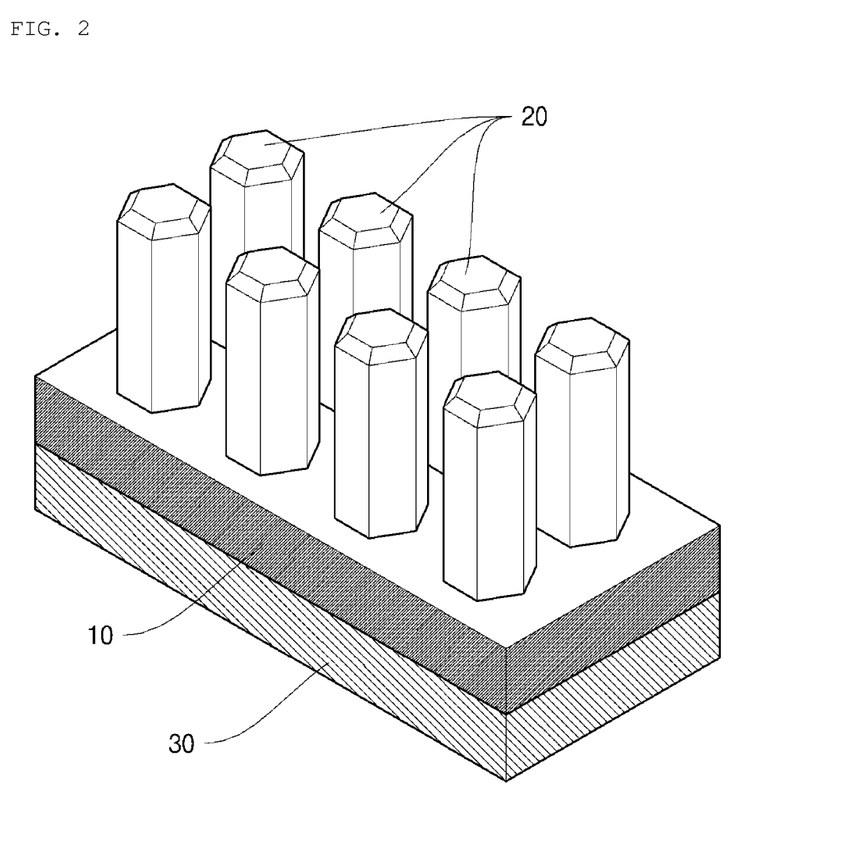
Figure 3:
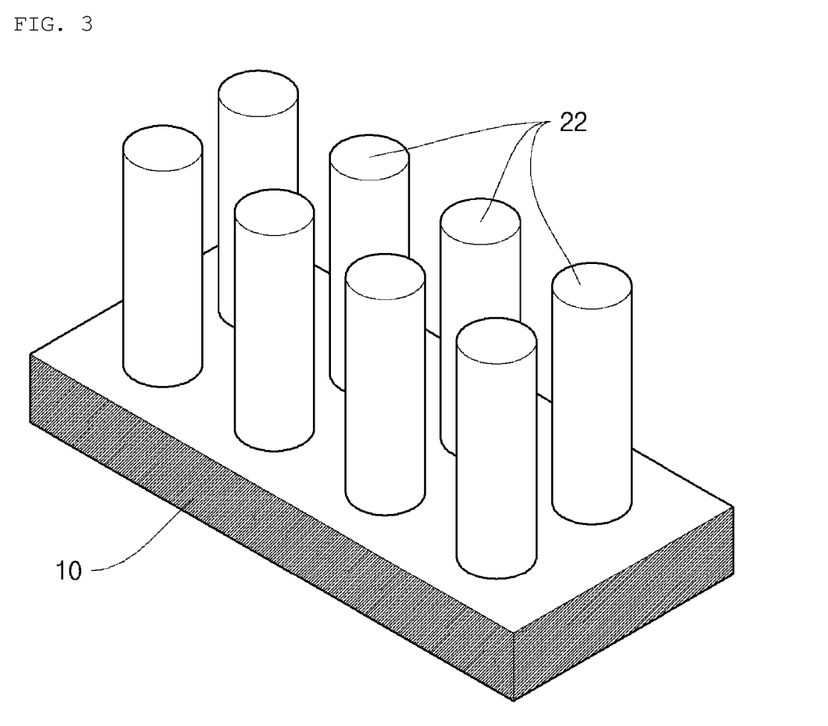
FIGS. 3 to 6 are perspective views showing the shapes of nanostructures according to preferred embodiments of the present invention.
Figure 4:
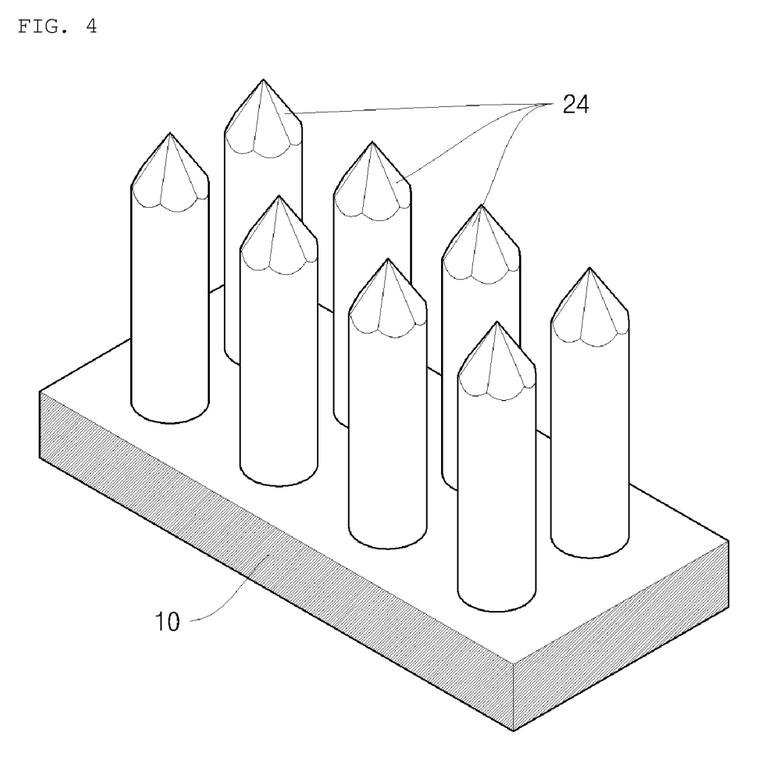
Figure 5:
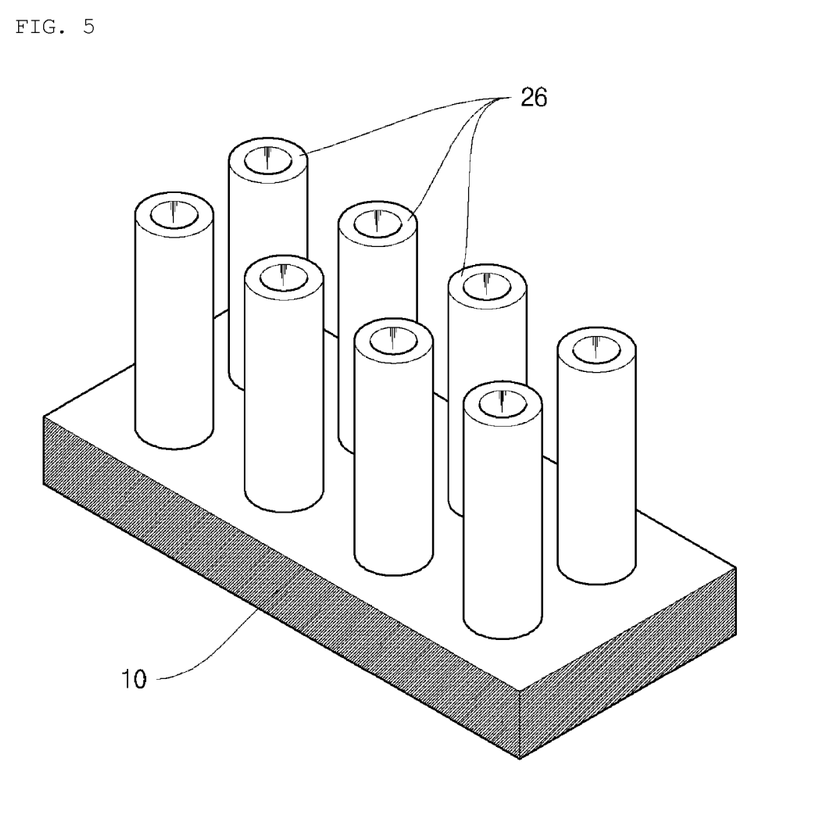
Figure 6:
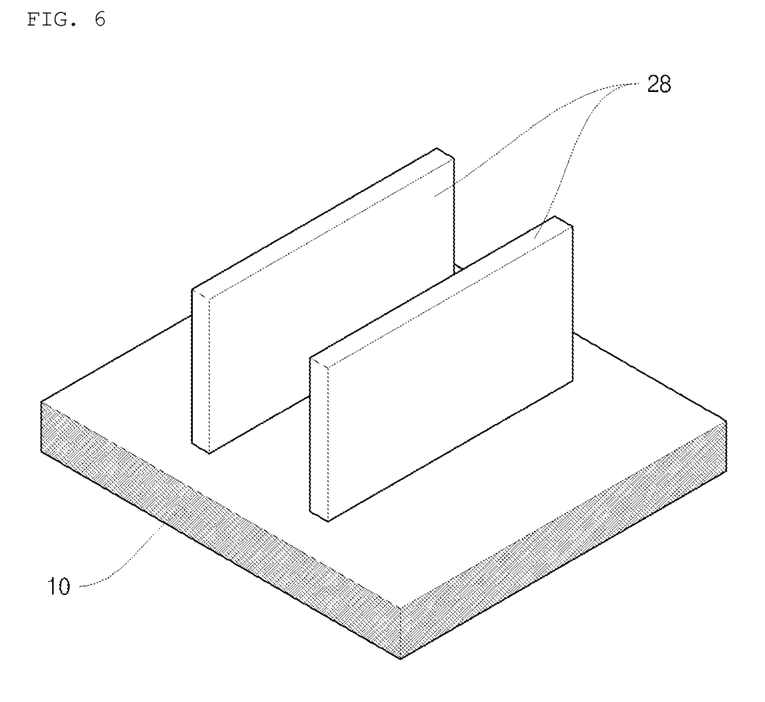
Figure 7:
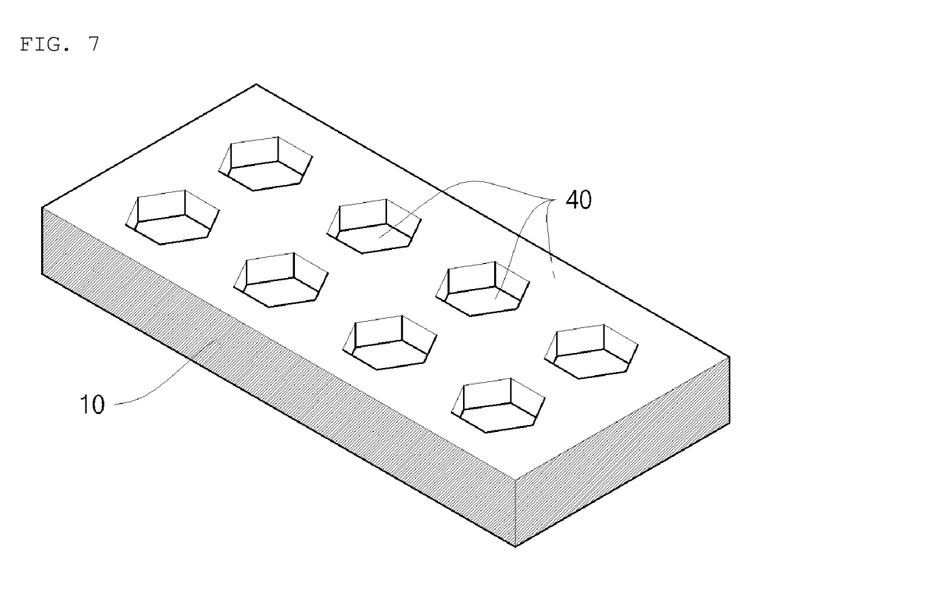
FIGS. 7 to 10 are perspective views showing the shapes of nanostructures formed in recesses of a carbon layer according to preferred embodiments of the present invention.

FIGS. 1 and 2 are perspective views showing basic nano devices according to preferred embodiments of the present invention.

As shown in FIG. 1, a nano device according to an embodiment of the present invention includes: a carbon layer 10 including one-layered graphene having a honeycombed planar structure in which carbon atoms are connected with each other and two or more-layered monocrystalline graphite; and one or more vertically-grown nanostructures 20 formed on the carbon layer.

As shown FIG. 2, the carbon layer 10 may be disposed on a substrate 30, and the carbon layer 10 itself may be used as a substrate.

FIGS. 3 to 6 are perspective views showing the shapes of nanostructures according to preferred embodiments of the present invention As shown in FIGS. 3 to 6, the nanostructures 20 constituting the nano device of the present invention may be made in the form of nonorods 22, nanoneedles 24, nonotubes 26 and nanowalls 28.

Each of the nanostructures 20 constituting the nano device has a ratio of length to diameter (including thickness) of 1~1000.

Further, each of the nanostructures 20 has a diameter (including thickness) of 1 nm~500 nm and a height of 10 nm~100 µm.

Further, each of the nanostructures 20 constituting the nano device is made of a metal or semiconductor material.

FIGS. 7 to 10 are perspective views showing the shapes of nanostructures formed in recesses of a carbon layer according to preferred embodiments of the present invention.

As shown in FIGS. 7 to 10, in the nano device according to an embodiment of the present invention, the carbon layer 10 includes one or more recesses 40 having any one shape of a circle, a triangle, a quadrangle, a pentagon, a hexagon and a line thereon.

Figure 8:
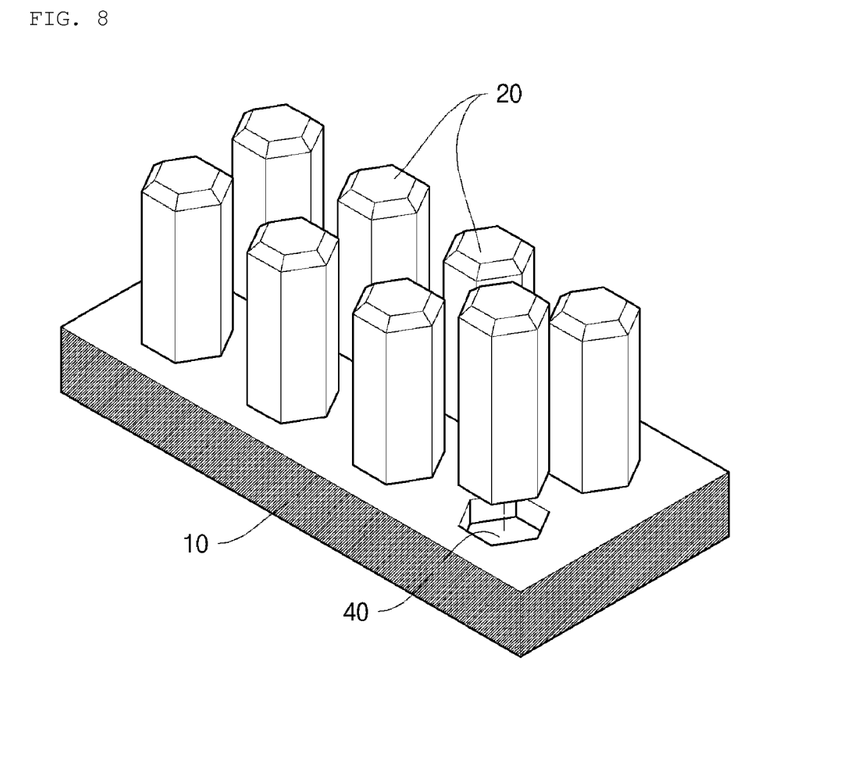

As shown in FIG. 8, the recesses 40 may act as a seed layer for growing nanostructures.

Further, the distance between the recesses 40 is 1 nm~10 µm.

The shapes of the recesses may be different from each other.

Figure 9:
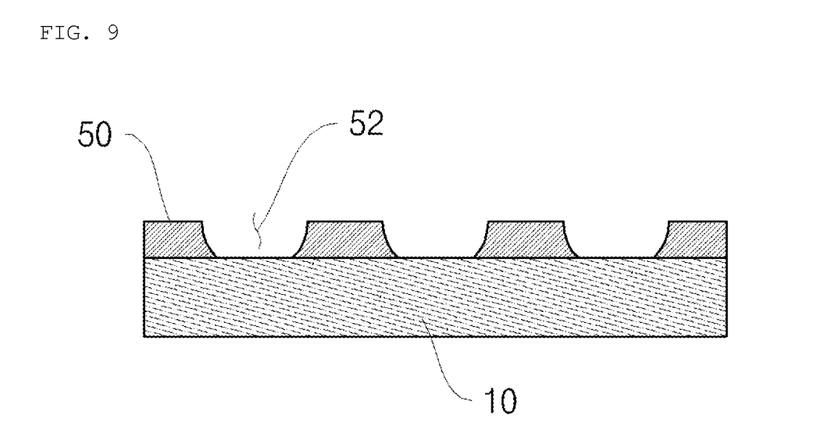
Figure 10:
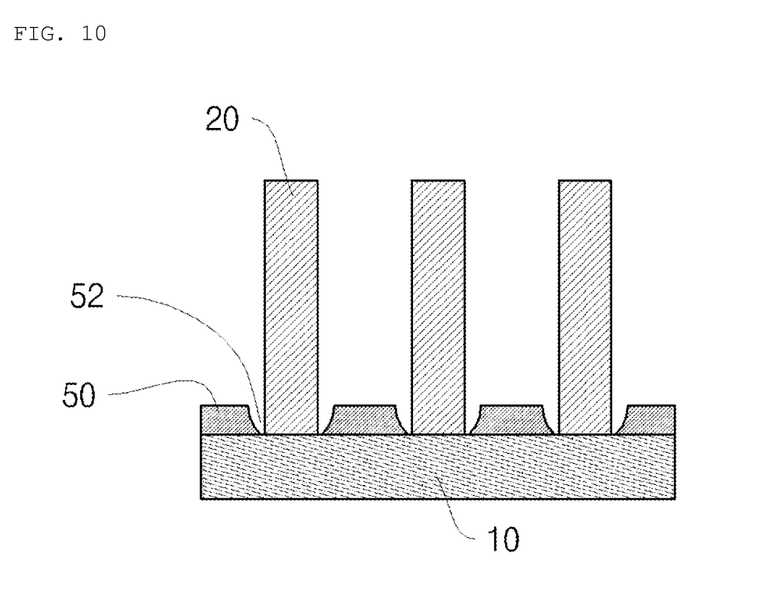

As shown in FIGS. 9 and 10, the nano device may further include a mask layer 50 between the carbon layers 10 and the nanostructures 20, the mask layer 50 having one or more openings 52.

The one or more openings 52 may be have any one shape selected from a circle, a triangle, a quadrangle, a pentagon, a hexagon and a line.

The distance between the openings 52 is 1 nm~10 μm.

Figure 11:
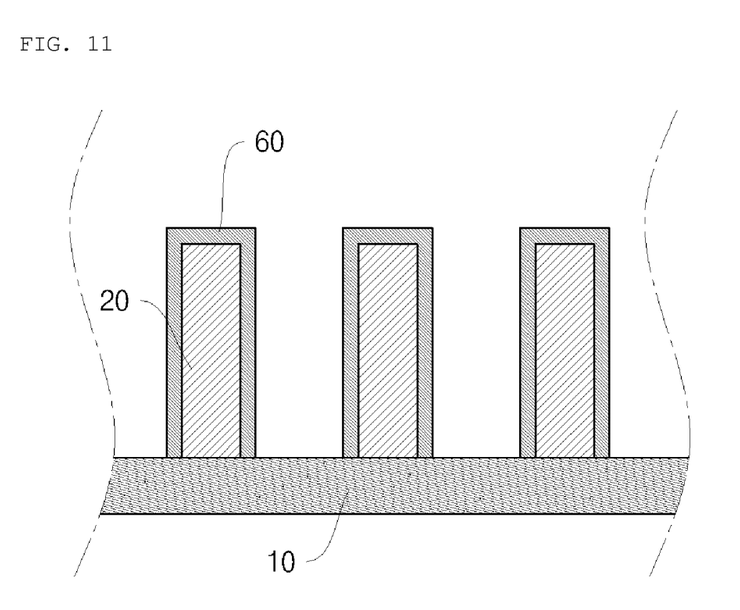
FIG. 11 is a sectional view showing the shape of nanostructures, which are coated with a multilayer film and grown on a carbon layer, according to a preferred embodiment of the present invention.

FIG. 11 is a sectional view showing the shape of nanostructures, which are coated with a multilayer film and which are grown on a carbon layer, according to a preferred embodiment of the present invention.

As shown in FIG. 11, the nano device may further include a multilayer film 60 uniformly covering the surface of each of the nanostructures 20.

The multilayer film 60 may have a thickness of 0.1 nm~1000 nm.

Figure 12:
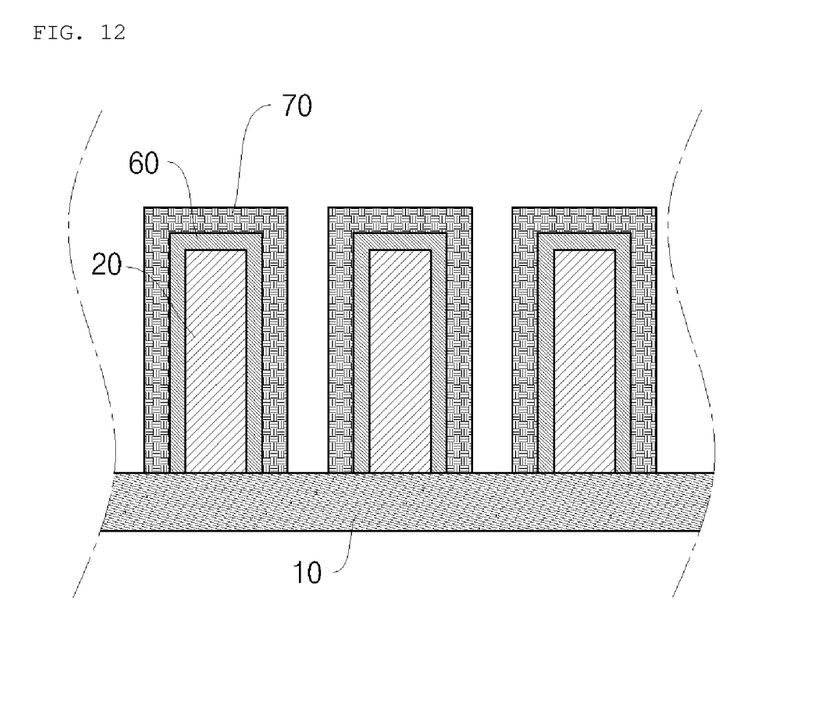
FIG. 12 is a sectional view showing the shape of nanostructures which are coated with multilayer films having different bandgaps from each other and which are grown on a carbon layer, according to a preferred embodiment of the present invention.

FIG. 12 is a sectional view showing the shape of nanostructures which are coated with multilayer films having different bandgaps from each other and which are grown on a carbon layer, according to a preferred embodiment of the present invention.

As shown in FIG. 12, each of the nanostructures 20 may be sequentially coated with a multilayer film 60 having a small bandgap and a multilayer film 70 having a large bandgap to form a junction.

Further, the junction of the multilayer films 60 and 70 and each of the nanostructures may have a quantum well structure.

Figure 13:
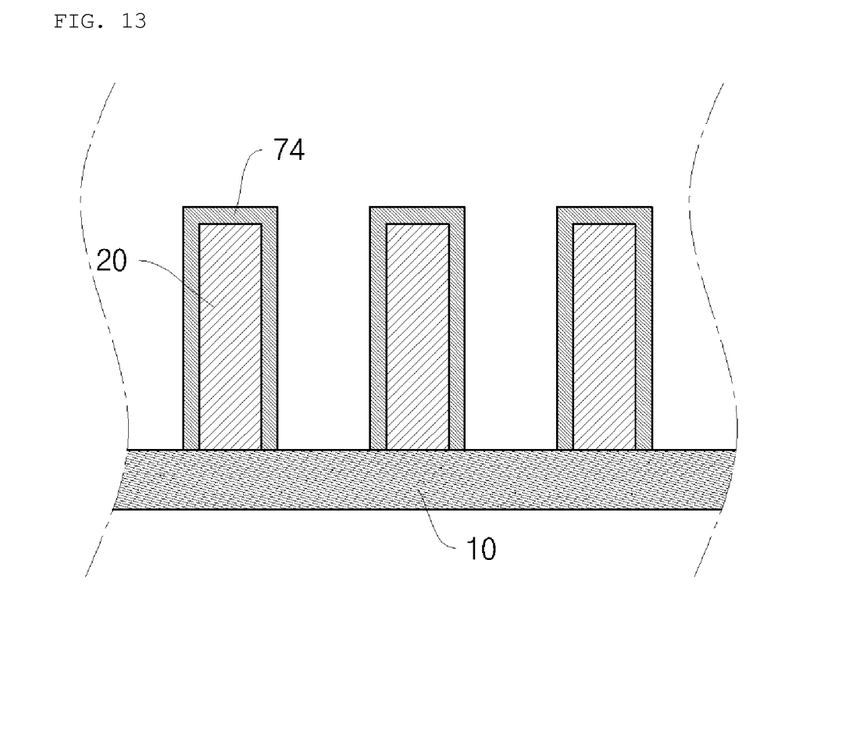
FIG. 13 is a sectional view showing the shape of a p-n junction of a multilayer film and a nanostructure according to a preferred embodiment of the present invention.

FIG. 13 is a sectional view showing the shape of a p-n junction of a multilayer film and a nanostructure according to a preferred embodiment of the present invention.

As shown in FIG. 3, a p-type multilayer film 74 and an n-type nanostructure can be formed into a p-n junction.

Figure 14:
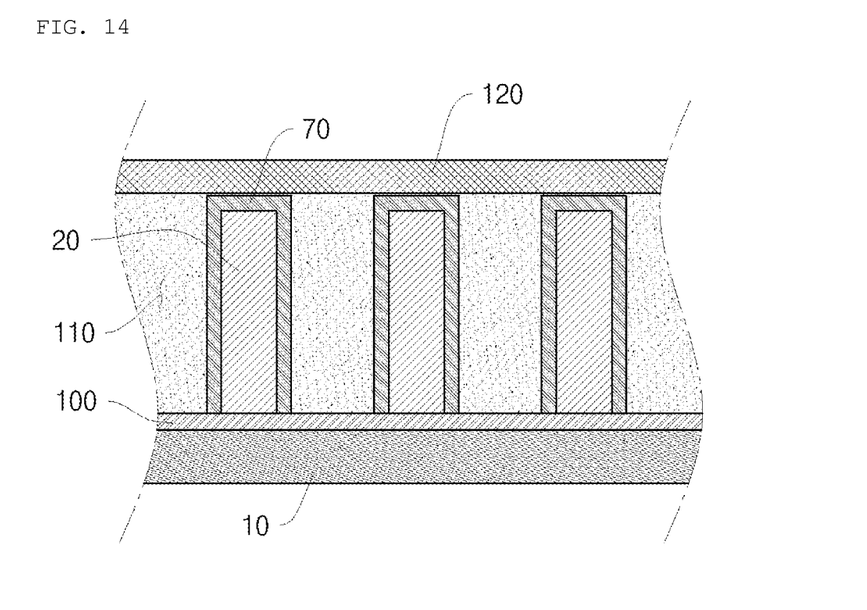
FIGS. 14 and 15 are sectional views showing nano devices according to preferred embodiments of the present invention.
Figure 15:
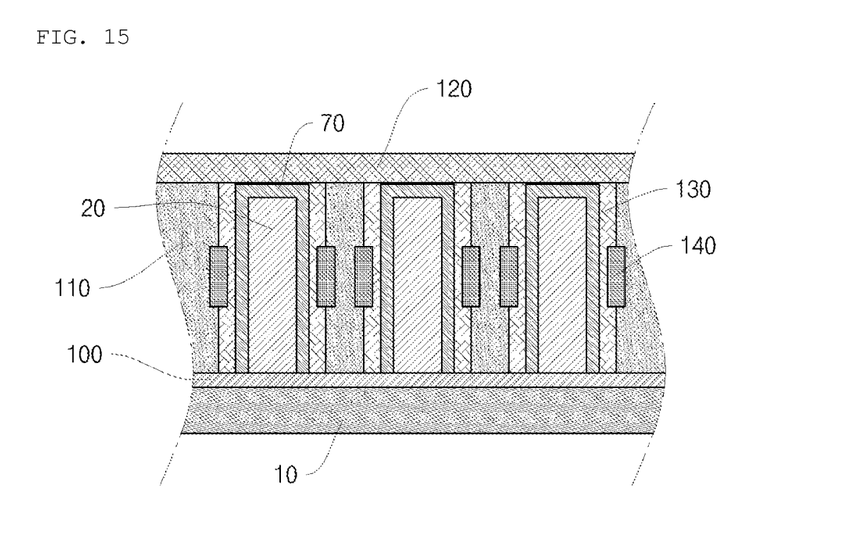

FIGS. 14 and 15 are sectional views showing nano devices according to preferred embodiments of the present invention.

As shown in FIG. 14, a nano device according to an embodiment of the present invention includes a carbon layer 10, nanostructures 20, an insulator 110, a drain electrode 120, and a source electrode 100.

Here, the carbon layer 10 may act as a source electrode, and one nano device may be provided with one source electrode 100 by patterning the carbon layer 10.

As a result, the source electrodes 100 are electrically insulated from each other, thus controlling the voltage applied to each of the nano devices.

The insulator 110 is formed between the nanostructures 20.

Therefore, the nano devices are electrically insulated from each other. Further, the insulator serves to electrically insulate the source electrode 100 from the drain electrode 120.

For this reason, the operation of each of the nano devices can be controlled.

Further, the drain electrode 120 is disposed on the nanostructures 20 and the insulator 110.

As shown in FIG. 15, a nano device according to an embodiment of the present invention includes a carbon layer 10, nanostructures 20, an insulator 110, a dielectric layer 130, a drain electrode 120, a gate electrode 140 and a source electrode 100.

Here, the carbon layer 10 may act as a source electrode 100, and one nano device may be provided with one source electrode 100 by patterning the carbon layer 10.

As a result, the source electrodes 100 are electrically insulated from each other, thus controlling the voltage applied to each of the nano devices.

The insulator 110 is formed between the nanostructures 20.

Therefore, the nano devices are electrically insulated from each other. Further, the insulator 110 serves to electrically insulate the source electrode 100 from the drain electrode 120.

For this reason, the operation of each of the nano devices can be controlled.

Further, the dielectric layer 130 is formed around the nanostructures 20. The dielectric layer 130 serves to insulate the drain electrode 120 from the gate electrode 140. The drain electrode 120 is disposed on the nanostructures 20 and the insulator 110.

As described above, there is provided a nano device including: a carbon layer including one-layered graphene having a honeycombed planar structure in which carbon atoms are connected with each other and two or more-layered monocrystalline graphite; and one or more vertically-grown nanostructures formed on the carbon layer, thus providing an integrated circuit in which various devices including a graphene electronic device and a photonic device are connected with each other.

Further, there is provided a high-purity and high-quality nano device having a small amount of impurities because a metal catalyst is not used.

What is claimed is:
1. A nano device, comprising:
   a carbon layer including
      one-layered graphene having a honeycombed planar structure in which carbon atoms are connected with each other, and
      two or more-layered monocrystalline graphite; and
   one or more vertically-grown nanostructures formed on the carbon layer.
2. The nano device according to claim 1, further comprising: a substrate disposed beneath the carbon layer forming a component of a circuit.
3. The nano device according to claim 1, wherein the nanostructure is any one selected from a nanorod, a nanoneedle, a nanotube and a nanowall.
4. The nano device according to claim 1, wherein the nanostructure has a ratio of length to diameter (thickness) of 1~1000.
5. The nano device according to claim 1, wherein the nanostructure has a diameter (thickness) of 1 nm~500 nm.
6. The nano device according to claim 1, wherein the nanostructure has a height of 10 nm~100 μm.
7. The nano device according to claim 1, wherein the nanostructure is made of a metal or a semiconductor.
8. The nano device according to claim 1, wherein a recess is formed on the carbon layer.
9. The nano device according to claim 8, wherein the recess has any one shape selected from a circle, a triangle, a quadrangle, a pentagon, a hexagon and a line.
10. The nano device according to claim 8, wherein the recess acts as a seed layer for growing the nanostructure.
11. The nano device according to claim 8, wherein two or more recesses are formed on the carbon layer, and the distance between the recesses is 1 nm~10 μm.
12. The nano device according to claim 8, wherein two or more recesses having a different shape from each other are formed on the carbon layer.
13. The nano device according to claim 1, further comprising: a mask layer between the carbon layers and the one or more nanostructures, the mask layer having one or more openings.
14. The nano device according to claim 13, wherein the opening has any one shape selected from a circle, a triangle, a quadrangle, a pentagon, a hexagon and a line.
15. The nano device according to claim 13, wherein the distance between the openings is 1 nm~10 μm.

16. The nano device according to claim 1, further comprising: a multilayer film uniformly covering the surface of the nanostructure.

17. The nano device according to claim 16, wherein the multilayer film has a thickness of 0.1 nm~1000 nm.

18. The nano device according to claim 16, wherein the nanostructure is coated with the multilayer film to form a plurality of junctions.

19. The nano device according to claim 16, wherein the junction of the multilayer film and the nanostructure has a quantum well structure.

20. The nano device according to claim 17, wherein the nanostructures are coated with the multilayer film to form a p-n junction.

21. A nano device, comprising:
a carbon layer including one-layered graphene having a honeycombed planar structure in which carbon atoms are connected with each other, and two or more-layered monocrystalline graphite;
a source electrode formed on the carbon layer;
one or more vertically-grown nanostructures formed on the carbon layer;
an insulator formed between the one or more nanostructures; and
a drain electrode formed on the one or more nanostructures.

22. The nano device according to claim 21, further comprising: a dielectric layer formed around the nanostructures.

* * * * *